United States Patent Office 3,654,155
Patented Apr. 4, 1972

3,654,155
ESTERS OF PHOSPHORODITHIOATES
Milton Braid, Westmont, N.J., assignor to
Mobil Oil Corporation
No Drawing. Original application June 3, 1968, Ser. No. 733,815, now Patent No. 3,544,465, dated Dec. 1, 1970. Divided and this application June 25, 1970, Ser. No. 49,985
Int. Cl. C10m 1/48
U.S. Cl. 252—46.7
12 Claims

ABSTRACT OF THE DISCLOSURE

Novel esters of O,O-diorgano-S-(2-hydroxyalkyl) phosphorodithioates are excellent antioxidants and corrosion inhibitors in industrial fluid compositions. Of particular interest are those phosphorodithioates which have been reacted with a boron-containing compound.

CROSS-REFERENCE TO RELATED APPLICATION

This application is a division of copending U.S. application Ser. No. 733,815, filed June 3, 1968, now Pat. No. 3,544,465.

BACKGROUND OF THE INVENTION

Field of the invention

This invention relates to esters of phosphorodithioates and, in particular, it relates to esters of diorganophosphorodithioate-alkylene oxide reaction products.

Description of the prior art

U.S. Pat. Nos. 3,197,405 and 3,197,496 describe reactions between triesters of phosphorothioic acids and inorganic phosphorus compounds. The products of these reactions are not entirely satisfactory as additives in industrial fluids.

SUMMARY OF THE INVENTION

Novel esters of organic phosphorodithioates are prepared by reacting a diorganophosphorodithioic acid with an olefin oxide and reacting the intermediate product of this reaction with a compound of boron, said compound being capable of forming a stable oxygen-ester bond with the said intermediate. The compound contains at least one reactive chemical group or atom, such as an acyl, acyloxy or hydroxyl group or a halogen atom.

DESCRIPTION OF SPECIFIC EMBODIMENTS

The products of this invention have the following structure:

$$[(RO)_2\overset{S}{\underset{\uparrow}{P}}S-\underset{\underset{R''}{|}}{C}H-\underset{\underset{R'}{|}}{C}H-O]_nB(Y)_m$$

wherein R, R' and R" may each be a hydrocarbyl radical, including alkyl, aralkyl, aryl or alkaryl, and substituted derivatives thereof, containing from 1 to about 30 carbon atoms, and R' and R" may also be hydrogen or members of a cyclic hydrocarbon ring or heterocyclic ring containing atoms of oxygen, nitrogen or sulfur therein, or of a polymeric chain having over 30 carbon atoms; Y is oxygen, sulfur, acyl, alkyl, aralkyl, aryl or alkaryl, alkoxy, aralkoxy, aryloxy and alkaryloxy, or a cycloalkyl, alkylenedioxy or arylenedioxy group, such organic groups containing from 1 to about 30 carbon atoms; n is an integer of from 1 to 3; and m is from 0 to v—n, v being the valence of boron. In other words, m is from 0 to 2 when the group attached to boron is other than one of the latter three groups and will actually have a value of 2 with respect to the valence of boron when such latter groups are attached.

The products of this invention are esters which are strikingly effective as anti-corrosion agents and antioxidants in industrial fluids, especially in lubricating oils. These esters are particularly effective in preventing corrosion of copper surfaces.

The intermediate product in this invention is prepared by a reaction between a diorganophosphorodithioic acid and an organo-1,2-oxide. The acid is produced by known means, usually by the reaction between an alcohol or a phenol or naphthol with phosphorus pentasulfide. This acid,

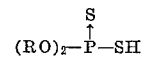

wherein R is defined above, is reacted with an organo-1,2-oxide in which the epoxide grouping is an internal or terminal group. One carbon atom becomes linked to a sulfur atom of the acid, and the hydroxyl group is in the 2-position relative to the sulfur atom as in the structure

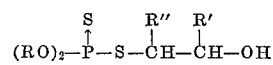

R' and R" being defined previously. This intermediate, which is also referred to as an O,O-diorgano-S-(2-hydroxyalkyl) phosphorodithioate, is then reacted with the reactive acyl, hydroxyl or halogen compound in a condensation reaction to produce the final product.

The alcohols found suitable for reaction with the $P_2S_5$ for producing the phosphorodithioic acid contain preferably from 1 to 20 carbon atoms and may include the alcohols, ethyl alcohol, propyl alcohol, n-butyl alcohol, isobutyl and sec-butyl alcohols, the isomeric primary and secondary amyl alcohols, and mixtures thereof, the primary and secondary isomers of hexyl alcohol, cyclohexyl alcohol, the isomers of octyl alcohol, decyl alcohol, lauryl alcohol, benzyl alcohol, mixtures of these, and the like. Aromatic hydroxy compounds include phenol, cresol, xylenol, naphthol, ethylphenol, butylphenol, nonylphenol, mixtures of these and the like. Mixtures of alcohols and aromatic hydroxy compounds are also suitable. Halogenated derivatives may also be employed.

The phosphorodithioic acids prepared from these alcohols and phenols are reacted with an organic oxide, which has the structure

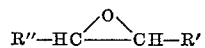

wherein R' and R" have the aforenoted definitions. Suitable oxides include ethylene oxide, propylene oxide, butylene oxide, cyclohexene oxide, styrene oxide and the like.

In another aspect of this invention, R' or R" or both may also contain additional epoxy groups, as in the cases of the diepoxides and polyolefin polyoxides. The resulting intermediate reaction product could contain two or more hydroxy groups and diorganophosphorodithio groups attached through the sulfur atom to the B-carbon atom relative to the hydroxide, as in the abreviated structure shown:

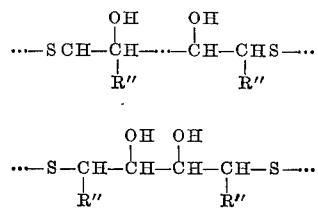

The final products could then have the structure:

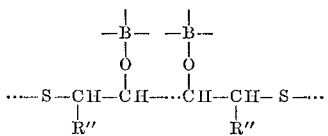

or

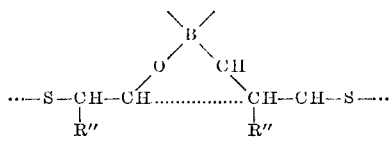

All such structures are included within the scope of this invention.

This reaction to produce the intermediate product is preferably performed in the presence of an inert organic solvent, such as benzene. The reaction mixture may be maintained at a preferred temperature range from about 0° to about 100° C. The reaction mixture may be thereafter refluxed to insure completion of the reaction. The solvent and any unreacted components are removed by distillation under reduced pressure. The reaction product may be refined further by filtering out any undesirable solids or distilling any unwanted side products.

The resulting intermediate is reacted with the active acyl, hydroxyl, or halogen compound, wherein the nonmetallic atom, boron, is attached to from 1 to 3 hydroxyl or acyl groups or halogen atoms. Ester formation may take place by condensation with elimination of water, hydrogen halide or acid.

Suitable boron reactants include the halides, boric, boronic or borinic acids, and partial esters thereof produced by reacting the acid or halide with an alcohol or a phenol. Hence Y may be an alkyl, aryl, alkoxy or aryloxy radical, or it may be a ring structure, as in the case of a catechol borate derivative. These organic boron compounds may be preformed prior to adding it to the intermediate, as indicated. Alternatively, boron acid or halide and the alcohol or phenol may be separately added to the phosphorodithioic acid-olefin oxide product and the formation occurs in the reaction mixture in situ.

Thus, Y may be an organic or member of one cyclic group, such as a cycloalkyl group or alkylenedioxy or arylenedioxy group. If one substituent attached to B is divalent, a multiple bond linkage may occur as in a carbonyl, sulfoxide or sulfone functional group. The organic radicals may contain from 1 to 30 carbon atoms, and preferably 1 to 20.

The products of this invention may be used in industrial fluids, such as lubricating oils and fuels. Suitable lubricating oils include naphthenic and paraffin mineral oils; synthetic lubricating oils, such as esters of beta-hindered alcohols having 2 to 4 hydroxy groups, such as neopentyl glycol, trimethylolpropane and pentaerythritol, and monocarboxylic acids having from 1 to 25 carbon atoms; hydrocarbon fluids produced from alkanes and olefins, such as polymers of 5 to 15 carbon atoms, i.e., trimer and tetramer of decene; polyglycol ethers; polysiloxane fluids; and the like. These fluids may be further compounded by thickeners to produce grease compositions. Liquid and solid fuels capable of being compounded, such as hydrocarbon fuels, kerosene and gasoline, may also be employed. Plastics and resins, normally susceptible to oxidative attack may be the base media for these additives. All of such compositions are given excellent inhibition and antioxidant stability by the additives of this invention.

The following examples are presented as illustrations of the invention and are not deemed a limitation thereof.

Example 1

To a solution of 100 grams (0.32 mole) of O,O-ditolyl-phosphorodithioate in 100 ml. of benzene, 25.2 grams (0.35 mole) of 1,2-butylene oxide is added over a 30-minute period while stirring and maintaining the reaction temperature at about 40° C. The resulting reaction mixture is then heated at 60° to 80° C. for 30 minutes, filtered and distilled at reduced pressure to remove solvent and unreacted butylene oxide. There remains 119.4 grams (97% yield) of the reaction product, O,O-ditolyl-S-(2-hydroxybutyl)phosphorodithioate.

*Analysis.*—Calc'd (percent): P, 8.09. Found (percent): P, 8.14.

Example 2

A mixture of 7.3 grams (0.118 mole) of boric acid and 130 grams (0.353) of O,O-ditolyl-S-(2-hydroxypropyl)phosphorodithioate is refluxed in 250 ml. of benzene, while the water is distilled off azeotropically and collected in a Dean-Stark tube. When no more water is produced, the reaction mixture is filtered and the solvent is distilled from the filtrate under reduced pressure. The product remaining is the borate ester of the reactant phosphorodithioate, a viscous yellow liquid.

*Analysis.*—Calc'd (percent): P, 8.36; B, 0.97. Found (percent): P, 8.23; B, 0.91.

Example 3

A mixture of 74 grams (0.194 mole) of O,O-di-tolyl-S-(2-hydroxybutyl)phosphorodithioate, 6.2 grams (0.1 mole) of boric acid and 11 grams (0.1 mole) of catechol in 200 ml. of benzene is refluxed as in Example 2. After workup and removal of solvent there remains 88.4 grams of the catechol borate ester of the phosphorodithioate, a clear slightly viscous yellow liquid.

*Analysis.*—P, 6.01; S, 13.2; B, 0.33.

Example 4

As in Example 2, a mixture of 127 grams (0.333 mole) of O,O-ditolyl-S-(2-hydroxybutyl)phosphorodithioate, 10.3 grams (0.166 mole) of boric acid, and 21.6 grams (0.166 mole) of isooctyl alcohol is refluxed in about 130 ml. of benzene. After work-up and removal of solvent there remains the isooctyl borate ester of the phosphorodithioate, a yellow moderately viscous liquid.

*Analysis.*—P, 6.52; B, 0.78.

Example 5

A mixture of 123 grams (0.322 mole) of O,O-ditolyl-S-(2-hydroxybutyl)phosphorodithioate, 86.6 grams (0.666 mole) of isooctyl alcohol, and 20.6 grams (0.333 mole) of boric acid in about 130 ml. of benzene was refluxed as in Example 2. After work-up and solvent removal there remains 228 grams of the diisooctyl borate ester of the phosphorodithioate, a clear light yellow, slightly viscous liquid.

*Analysis.*—P, 4.39; B, 1.30.

Example 6

In a suitable reactor, 35 grams of vinyl cyclohexene dioxide ("Unox 206," a product of Union Carbide) and 121 grams of O,O-diisobutylphosphorodithioate were reacted together, which was conducted for about 1½ hours at a temperature of from 40° to 45° C. The liquid product represented a 97% yield.

*Analysis.*—Calc'd (percent): P, 9.91; S, 20.6. Found (percent): P, 9.79; S, 19.9.

This product is reacted with 0.125 mole of catechol borate; the product contains a residual hydroxy group. This product is also reacted with 0.25 mole of the borate. Both products are useful additives for base media.

EVALUTION OF PRODUCTS

The compounds produced in accordance with this invention were blended into a refined mineral oil lubricant and tested in an oxidation test. A sample of the test composition is heated to 325° F. and air at the rate of about 10 liters per hour is passed through for a period of about 40 hours. Present in the test sample are specimens of iron, copper, aluminum, and lead. The loss in the weight of lead sample is measured, as are the increase in kinematic viscosity measured at 210° F. (percent KV change) and the change in the neutralization number (NN change). It should be noted that the metals are typical metals of engine or machine construction, and they also provide some catalysis for oxidation or organic materials. The compositions are also rated for oxidation stability, said numbers being based on the amount of phosphorus present in the sample required to limit the neutralization number increase to a maximum of 2.0. The results are tabulated in Table 1.

TABLE 1

| Additive of example | Conc. wt. percent | NN change | Percent KV change | Lead loss, mg. | Stability |
|---|---|---|---|---|---|
| None | | 20.75 | 271 | 80 | |
| 2 | 0.25 | 0.92 | 15 | 4 | |
| 3 | 1 | −0.38 | 9 | 0.6 | 25 |
|   | 0.5 | 0.49 | 11 | 1.4 | |
| 4 | 1 | 0 | 7 | 3.7 | 26 |
|   | 0.5 | 0.69 | 11 | 3.1 | |
| 5 | 1.0 | 0.55 | 8 | 0.3 | |
|   | 0.5 | 2.06 | 16 | 9.7 | |

The products of this invention were tested in the Bearing Corrosion Engine Test. In this test, a single cylinder CLR oil test engine (manufactured by Labeco) is operated for a period of 40 hours at a speed of 3150±10 r.p.m. and a temperature which may reach 290° F. The lubricant is a refined mineral oil containing an additive of this invention. At the end of the test, a copper-lead bearing is weighed to determine the loss of weight in mg. The result is evidence of the ability of an additive to protect the said bearing. The following results were obtained:

TABLE 2

| Product of example | Conc., wt. percent | Bearing wt. loss, mg. |
|---|---|---|
| None | | 3,669 |
| 2 | 1 | 41 |
| 3* | 1.5 | 47 |
| 4* | 1.4 | 40 |

*Contains 3% by weight of the borated non-metallic detergent.

The results of the tests shown in the above tables indicates that the additives of this invention provide excellent antioxidant protection and reduce metal corrosion in engines.

The products of this invention may be used in lubricating oils, fuels and other industrial compositions, both liquid and solid. These compositions may contain other additives which provide additional characteristics of performance. From about 0.05% to about 10% by weight of the products may be present in the finished composition.

Having described the invention by means of specific illustrations and other embodiments, minor variations of which are still within the scope of the invention, I claim:

1. An organic composition comprising a major proportion of a lubricating oil or liquid fuel and an antioxidant amount of a product of the formula

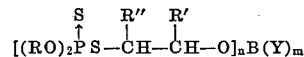

wherein R is selected from the group consisting of alkyl, aralkyl, aryl and alkaryl, each containing from 1 to 30 carbon atoms, R'' and R' are selected from the group consisting of hydrogen and R, Y is selected from the group consisting of oxygen, sulfur, alkyl, aryl, alkoxy, aryloxy, the latter four groups having from 1 to about 30 carbon atoms, cycloalkylene, alkenylenedioxy and arylenedioxy, $n$ is from 1 to 3 and $m$ is from 0 to $v-n$, $v$ being the valence of B.

2. The composition of claim 1 wherein $m$ is at least 1.

3. The composition of claim 1 wherein $m$ is zero.

4. The composition of claim 3 wherein R is tolyl, the

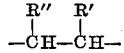

is a propyl group, and $n$ is 3.

5. The composition of claim 1 wherein B and Y form the catechol borate group.

6. The composition of claim 5 wherein R is tolyl, the

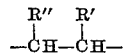

is a butyl group, and $m$ is 1.

7. The composition of claim 1 wherein Y is an octyloxy group and $m$ is 2.

8. The composition of claim 1 wherein R is selected from the group consisting of aryl and alkaryl.

9. The composition of claim 8 wherein R is tolyl.

10. The composition of claim 1 wherein the organic base medium is a lubricating oil.

11. The composition of claim 1 wherein R is tolyl,

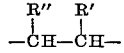

is butyl, Y is isooctyl, $n$ is 2 and $m$ is 1.

12. The composition of claim 1 wherein R is tolyl,

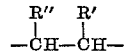

is butyl, $m$ is 1 and Y and B form this catechol borate group.

References Cited
UNITED STATES PATENTS 3,117,089 1/1964 De Young et al. _____ 252—46.7
3,150,094 9/1964 De Young et al. _____ 252—46.7
3,291,734 12/1966 Liao _____ 252—46.7

DANIEL E. WYMAN, Primary Examiner

W. H. CANNON, Assistant Examiner

U.S. Cl. X.R.

44—76; 252—400; 260—922

UNITED STATES PATENT OFFICE
CERTIFICATE OF CORRECTION

Patent No. 3,654,155         Dated April 4, 1972

Inventor(s) MILTON BRAID

It is certified that error appears in the above-identified patent and that said Letters Patent are hereby corrected as shown below:

In column 2, line 65,

" 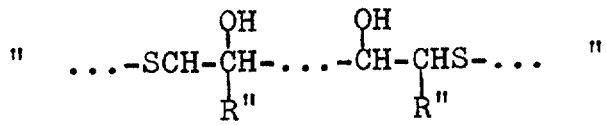 "

should be

-- 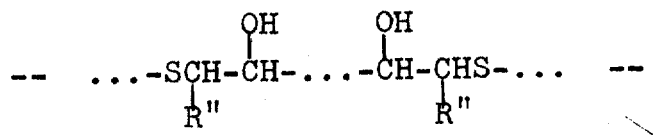 --

In column 2, line 67, insert the word "or" between the two formulas. In column 3, line 12, " 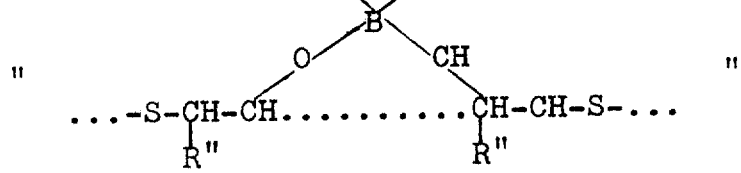 "

should be

-- 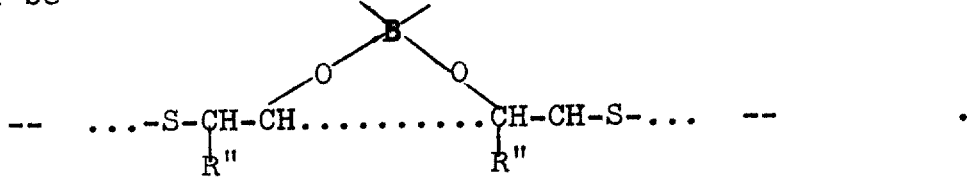 --

In column 3, line 44, after the word "organic", insert -- or inorganic group --. In column 3, line 53, "paraffin" should be -- paraffinic --.

Signed and sealed this 22nd day of August 1972.

(SEAL)
Attest:

EDWARD M. FLETCHER, JR.
Attesting Officer

ROBERT GOTTSCHALK
Commissioner of Patents